(12) United States Patent
Darraba et al.

(10) Patent No.: US 6,647,886 B2
(45) Date of Patent: Nov. 18, 2003

(54) VEHICLE SYSTEM

(75) Inventors: Roger Darraba, Montesson (FR); Denis Bourcart, Rochester, MI (US); Bernard Demersseman, Royal Oak, MI (US)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/157,035

(22) Filed: May 30, 2002

(65) Prior Publication Data

US 2002/0195016 A1 Dec. 26, 2002

Related U.S. Application Data (63) Continuation-in-part of application No. 09/601,165, filed as application No. PCT/SE99/00044 on Jan. 15, 1999, now abandoned.

(30) Foreign Application Priority Data

Jan. 29, 1998 (GB) .............................................. 9801941

(51) Int. Cl.⁷ ............................ C06C 7/00; F42C 11/00; F42C 21/00; F23Q 7/02; F23Q 21/00; B60R 21/32
(52) U.S. Cl. ........................ 102/206; 102/200; 102/218; 280/735
(58) Field of Search ................................ 102/200, 206, 102/217, 218; 280/735

(56) References Cited

U.S. PATENT DOCUMENTS

| | | | | |
|---|---|---|---|---|
| 2,671,399 A | * | 3/1954 | Morris ........................ 102/217 |
| 3,741,584 A | | 6/1973 | Arai ............................ 280/150 |
| 4,471,918 A | | 9/1984 | Ando ........................... 242/107 |
| 4,614,876 A | * | 9/1986 | Mattes et al. ............. 307/10 SB |
| 5,442,244 A | * | 8/1995 | Furui .......................... 307/10.1 |
| 5,460,404 A | | 10/1995 | Damisch et al. ............. 280/735 |
| 5,609,358 A | | 3/1997 | Iyoda et al. .................. 280/735 |
| 5,805,058 A | * | 9/1998 | Saito et al. .................. 340/436 |
| 6,072,246 A | * | 6/2000 | Schafer ....................... 307/10.1 |
| 6,498,494 B2 | * | 12/2002 | Belau et al. ................. 324/522 |

FOREIGN PATENT DOCUMENTS

| | | | |
|---|---|---|---|
| DE | 198 22 263 A1 | 11/1998 | |
| EP | 0 421 574 A2 | 4/1991 | |
| EP | 0 721 863 A2 | 7/1996 | |
| EP | 0 731 003 A1 | 9/1996 | |
| GB | 2 348 554 | * 10/2000 | ............... 102/206 |
| WO | WO 90/02674 A1 | 3/1990 | |
| WO | WO 97/23369 A1 | 7/1997 | |

* cited by examiner

Primary Examiner—Michael J. Carone
Assistant Examiner—H. A. Blackner
(74) Attorney, Agent, or Firm—Venable LLP; Robert Kinberg; Chad Anderson (57) ABSTRACT

A safety system for a motor vehicle includes a plurality of safety devices each adapted to be activated in the event that an accident should occur. Each safety device includes at least one element selected from the group comprising an electric activator for activating the safety device and a sensor to sense a parameter related to the safety device. The system includes a first conductive arrangement comprising at least one first conductor and a first group of a plurality of switches, with each switch of the first group being connected to one of the first conductors. The system includes a second conductive arrangement comprising at least one second conductor, and a second group of a plurality of switches, with each switch of the second group being connected to one of the second conductors. The elements are connected in a circuit so that each element is connected between one switch of the first group of switches and one switch of the second group of switches. At least one switch in each group is connected to at least two elements, with each of the two elements being connected to different switches of the other group of switches.

35 Claims, 8 Drawing Sheets

VEHICLE SYSTEM

CROSS-REFERENCE TO RELATED APPLICATIONS

This Application is a Continuation-in-Part of U.S. patent application Ser. No. 09/601,165, filed Nov. 11, 2000 now abandoned which was a U.S. national stage application of International Application PCT/SE99/00044 of Jan. 15, 1999 of Roger Darraba and Denis Bourcart, which claims priority of United Kingdom Application No. 9801941.7 filed Jan. 29, 1998, the disclosures of such applications being incorporated herein by reference.

FIELD OF THE INVENTION

THE PRESENT INVENTION relates to a vehicle safety system, and more particularly relates to a vehicle safety system which incorporates a plurality of safety devices, such as air-bags or safety-belt pre-tensioners, which are activated by means of a squib

BACKGROUND OF THE INVENTION

Many vehicle safety systems incorporate a plurality of safety devices, such as air-bags or safety-belt pre-tensioners, with each device being activated by means of a squib. Also, many vehicle safety systems include one or more sensors, some of which may be simple switches, to determine the condition of various parts of the safety system before active parts of the safety system are activated or deployed. For example, a safety-belt buckle may incorporate a switch which indicates whether the buckle is, or is not, in use. Information concerning the status of the buckle may be very relevant in deciding, in an accident situation, whether to deploy a pre-tensioner associated with a safety-belt adapted to be connected to that buckle.

A typical safety device, such as an air-bag or a pretensioner, may comprise a squib resistor which is embedded within a pyrotechnic charge. When the safety device is to be deployed, an electric current from a power source is passed through the squib resistor which ignites the pyrotechnic charge. The pyrotechnic charge generates gas which inflates the air-bag or actuates the pretensioner.

In order to minimise any risk of inadvertent deployment of the safety device, the circuit which is utilised to connect the squib to the power source should incorporate two switches, with one switch being provided on each side of the squib. It is to be appreciated that in such a situation if, and only if, both switches are closed, will a current pass through the squib to ignite the squib. It is intended that the switches will be closed in response to signals from appropriate sensors which indicate that an accident is likely to occur or is occurring. Thus there is a minimum risk that the safety devices in the vehicle will be inadvertently deployed, for example as a result of a spurious current.

Figure 1:
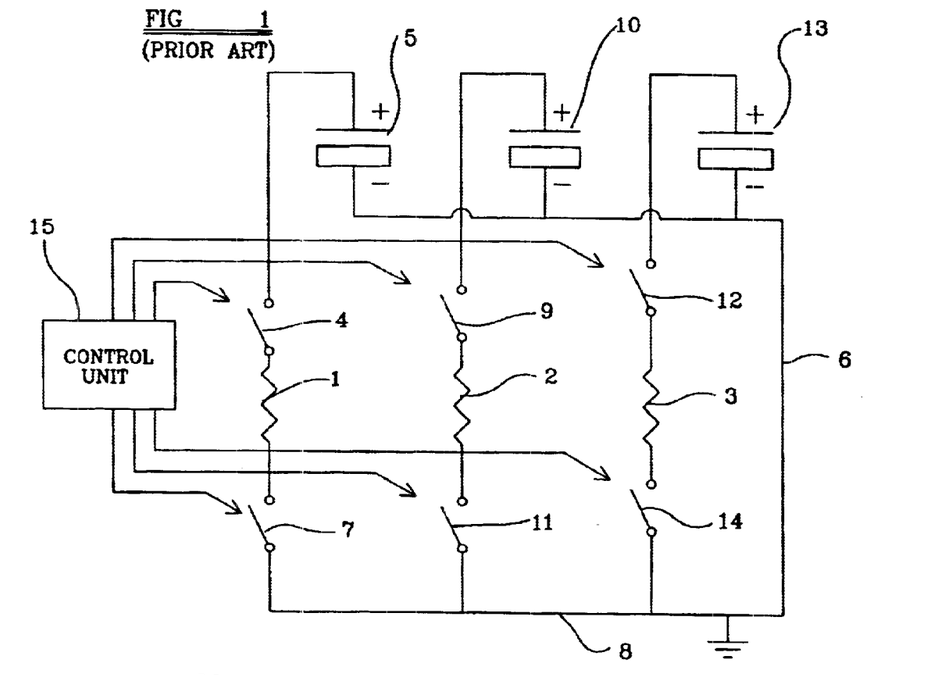
FIG. 1 is a circuit diagram of a prior art arrangement.

FIG. 1 of the accompanying drawings is a circuit diagram which illustrates a typical prior proposed vehicle safety system. FIG. 1 illustrates three squib resistors 1, 2, 3 each of which is associated with a respective safety device. The first squib resistor has one end which is connected by means of a first switch 4 to one pole of a capacitor 5, the other pole of which is connected to earth by means of a rail 6. The other end of the squib resistor 1 is connected by means of a switch 7 to a rail 8 which is also connected to earth.

The second squib resistor 2 has a first end which is connected by means of a switch 9 to one pole of a capacitor 10, the other pole of the capacitor 10 being connected to earth by means of the rail 6. The other end of the squib resistor 2 is connected, by means of a switch 11, to the rail 8 which is also connected to earth. The third squib resistor 3 is provided, at one end, with a switch 12 which is connected to one pole of a capacitor 13, the other pole of which is connected to earth by means of the rail 6. The other end of the squib resistor 3 is provided with a switch 14 which is connected to earth by the rail 8.

The switches (4, 9, 12 and 7, 11, 14) are each individually controlled by a control unit 15.

It is to be appreciated that initially the capacitors 5, 10 and 13 will be charged. If, for example, the control unit causes the switches 4 and 7 to be closed, the capacitor 5 will be discharged through the resultant circuit which comprises the switch 4, the squib 1, the switch 7, the rail 8 and the rail 6. The safety device associated with the squib resistor 1 will thus be deployed. If other appropriate combinations of switches are closed, other safety devices will be actuated.

Figure 2:
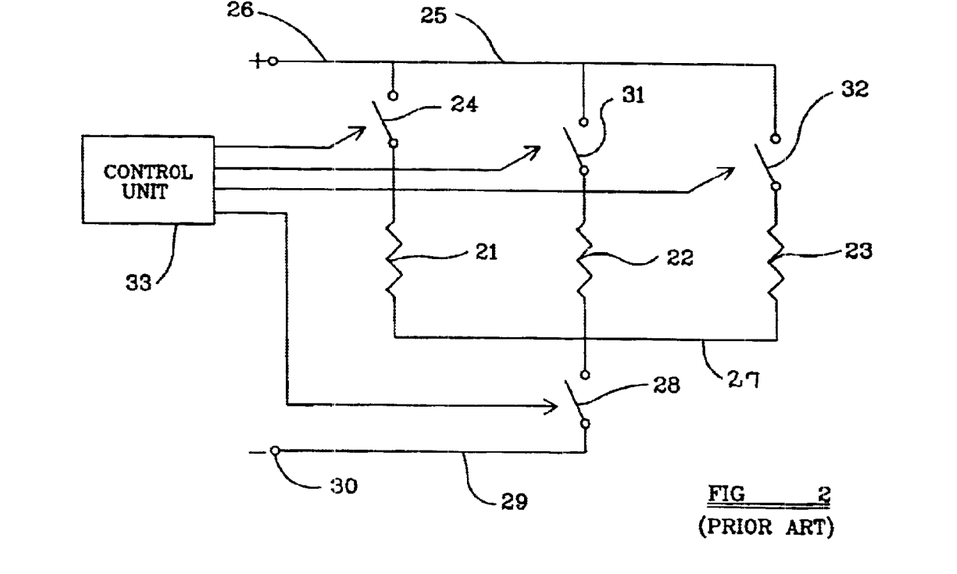
FIG. 2 is a circuit diagram of another prior art arrangement.

FIG. 2 is a circuit diagram which illustrates a modified embodiment of the safety system shown in FIG. 1. Referring to FIG. 2, three squib resistor 21, 22, 23 are provided, each of which is associated with a respective safety device. One end of the squib resistor 21 is connected by means of a switch 24 to a rail 25, the rail 25 being connected to a source of potential 26, such as a source of positive potential. The other end of the squib resistor 21 is connected directly to a rail 27 which is connected by means of a single switch 28 to a line 29 which is connected to a further source of potential 30, such as a source of negative potential.

The second squib resistor 22 has one end connected by means of a switch 31 to the rail 25, and has the other end connected directly to the rail 27. The third squib resistor 23 has one end connected by means of a switch 32 to the rail 25, and has the other end connected directly to the rail 27.

The switches (24, 31, 32 and 28) are all individually controlled by a control unit 33. If the control unit 33 closes the switch 28, and then closes one of the switches 24 or 31 or 32, current will flow through a selected squib resistor 21, 22 or 23, depending upon precisely which of the three switches 24, 31, 32 has been closed, thus deploying the respective safety device.

It is to be appreciated that in the arrangement shown in FIG. 1, the number of switches is equal to twice the number of squib resistors. In the arrangement shown in FIG. 2, the number of switches is equal to the number of squib resistors plus one. Switches are expensive to manufacture, and the present invention seeks to provide a safety system for a vehicle which will operate satisfactorily, but in which manufacturing costs are reduced.

SUMMARY OF THE INVENTION

According to one aspect of this invention there is provided a safety system for a motor vehicle, the safety system incorporating at least one safety device adapted to be activated in the event that an accident should occur, the safety device being provided with at least one element selected from the group comprising an electric activator for activating the safety device and a sensor to sense a parameter related to the safety device, there being a plurality of said elements in the complete safety system, the safety system further comprising first conductive means consisting of at least one first conductor and a first group of a plurality of switches, each switch of the first group being connected to a said first conductor, and second conductive means consisting of at least one second conductor, and a second group of a plurality of switches, each switch of the second group being connected to a said second conductor, the elements being connected in circuit, with each element being connected between one switch of the first group of switches and one switch of the second group of switches, the arrangement being such that at least one switch in each group is connected to at least two elements, with each of said two elements being connected to different switches of the other group of switches.

Preferably as least some of said elements are electric activators constituted by squibs in the form of a resistor associated with respective pyrotechnic charges.

Conveniently each said element is connected to a unique combination of one switch from the first group of switches and one switch from the second group of switches.

Advantageously at least one element is in the form of an electric activator constituted by a solenoid.

Conveniently the first conductive means are connected to at least one source of the first potential and the second conductive means are connected to at least one source of a potential which is opposite to said first potential.

At least some of the elements may be constituted by sensors such as switches or resistors, and a switching arrangement may be provided to connect each sensor in circuit with a parameter sensor, such as an ohm meter.

Conveniently at least some of said electrical activators are connected in series with a command controlled switch, the system including a command signal generator adapted to general command signals to close each command controlled switch.

Thus the invention also relates to a safety system for a motor vehicle, the safety system incorporating at least one safety device adapted to be activated in the event that an accident is likely to occur or is occuring, the safety device being provided with at least one electrical activator for activating the safety device, there being a plurality of said activators in the complete safety system, each activator incorporating a respective command signal controlled switch, the vehicle safety system further comprising first conductive means consisting of at least one first conductor and a first group of plurality switches, each switch of the first group being connected to a said first conductor and a second conductive means consisting of at least one second conductor, and a second group of a plurality of switches, each switch of the second group of switches being connected to a said second conductor, the activators being connected in circuit, with each activator being connected between one switch of the first group of switches and one switch of the second group of switches, the arrangement being such that at least one switch in each group is connected to at least two activators, with each of said two activators being connected to different switches of the other group of switches, a command signal generator being provided adapted to generate command signals to close the said command signal controlled switches.

Conveniently at least one safety device is provided with a plurality of activators, the identity of the activator or activators utilised to activate the safety device determining the mode of operation of the safety device.

Preferably each switch in each group of switches is connected to the same number of activators as there are switches in the other group of switches.

Advantageously each switch of the first group is connected to a respective rail, forming a first group of rails, and each switch of the second group is connected to a rail, forming the second group of rails, individual rails in the first group of rails being connected to individual rails in the second group of rails by means of respective activators.

Preferably the switches of the two groups of switches are individually controlled by means of a control unit, the control unit being responsive to sensors adapted to provide signals in the event of an accident about to occur or is occurring.

Conveniently the control unit is also responsive to signals from sensor means indicating the presence of or position of an occupant of the vehicle.

Advantageously each command signal controlled switch responding to a unique command signal.

BRIEF DESCRIPTION OF THE DRAWINGS

In order that the invention may be more readily understood, and so that further features thereof may be appreciated, the invention will now be described by way of example with reference to FIGS. 3 to 12 of the accompanying drawings in which.

DESCRIPTION OF PREFERRED EMBODIMENTS

Figure 3:
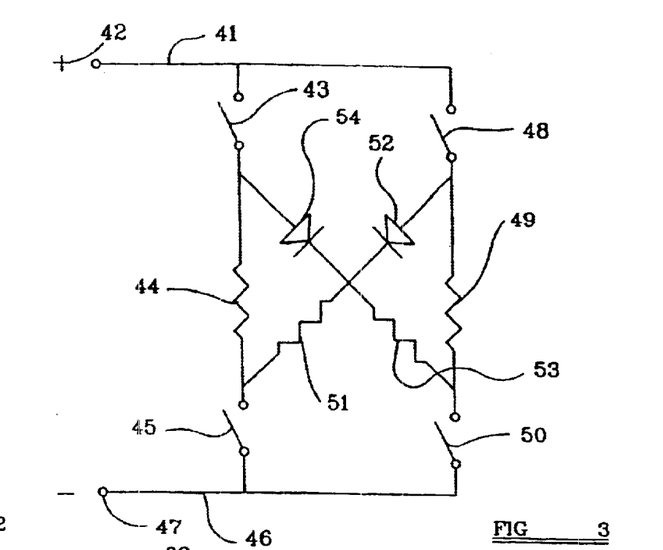
FIG. 3 is a circuit diagram of part of the triggering circuit for safety devices in a vehicle safety system in accordance with the invention.

Referring initially to FIG. 3, an arrangement is illustrated in which a first conductor constituted by rail 41 is connected to a first source of potential 42, which is a source of positive potential. The rail 41 is connected by means of a first switch 43 to one end of a first resistor 44 which forms the squib for a safety device. The squib constitutes an activator for activating the safety device. The safety device may be an air-bag or a seat belt pre-tensioner, for example. The other end of the first resistor 44 is connected by means of a switch 45 to a second conductor constituted by rail 46 which is connected to a second source of potential 47, which is a source of negative potential. It will be understood that the two sources of potential are such that when both the switch 43 and the switch 45 are closed, a current will flow between the sources of potential through the resistor 44.

The rail 41 is also connected by means of a third switch 48 to one end of a second resistor 49, which again forms a squib for a safety device. The other end of the resistor 49 is connected by means of a switch 50 to the rail 46. A third resistor 51 is provided, which forms a squib for a further safety device, one end of which is connected by means of a diode 52 to the switch 48, and the other end of which is connected to the switch 45. A fourth resistor 53 (shown in phantom) may also be provided having one end connected by a diode 54 (shown in phantom) to the switch 43, and the other end connected to the switch 50. The fourth resistor will also form a squib for a safety device.

It will be appreciated that if the switch 43 is closed and the switch 45 is closed, current will flow through the resistor 44, thus causing a safety device in which that resistor forms the squib for the pyrotechnic device to be deployed. Similarly, if the switch 48 and the switch 50 are closed current will flow through the resistor 49, causing the safety device in which the resistor 49 acts as the squib in the pyrotechnic device to be deployed. If, however, the switch 48 and the switch 45 are closed, current will flow through the diode 52 and through the resistor 51, thus causing the safety device in which the resistor 51 is the squib of the pyrotechnic device to be deployed. Equally, if the switch 43 and the switch 50 are closed, current will flow through the diode 54 and the resistor 53, causing the safety device in which the resistor 53 forms the squib in the pyrotechnic charge to be deployed.

Consequently, in this arrangement, although only four switches are provided, it is possible to provide individual control to four resistors, and consequently it is possible to control the deployment of four safety devices merely by using four switches. The reason for this is that each switch is connected to a plurality of resistors.

The diodes 52 and 54 are provided to ensure that current only flows in the intended direction through the resistors 51 and 53.

Figure 4:
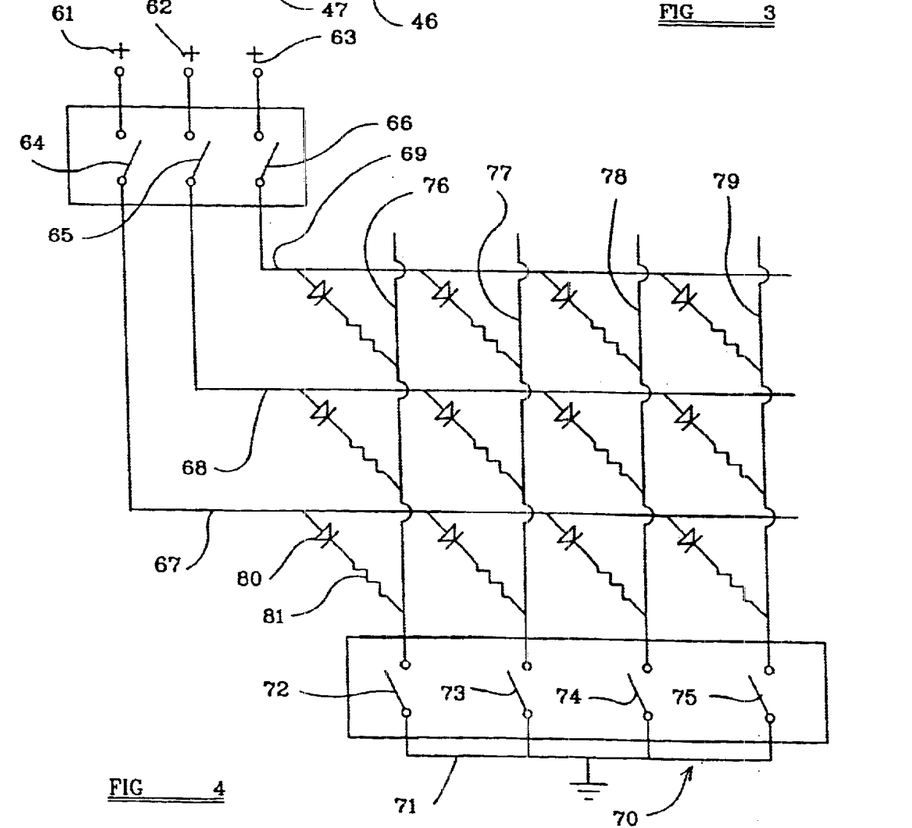
FIG. 4 is a circuit diagram of an alternative triggering circuit.

Referring now to FIG. 4, a rather larger arrangement is illustrated which incorporates twelve resistors, each of which forms a squib in a safety device.

In FIG. 4, a plurality of sources 61, 62, 63 of positive potential are shown, although these sources may comprise a single source such as a positive rail. The source or sources of positive potential are connected, by means of three switches 64, 65, 66 to three respective first conductors constituted by rails 67, 68, 69.

A second source of potential 70 is shown, which in this embodiment comprises an earth rail 71. The earth rail 71 is connected by means of four separate switches 72, 73, 74, 75 to separate second conductors constituted by rails 76, 77, 78, 79. Each of the three rails 67, 68 and 69 is connected to each of the four rails 76, 77, 78, 79 by means of a respective series connection of a diode, such as the diode 80, and a resistor such as the resistor 81. There are thus twelve diode-and-resistor 80, 81 combinations.

It is to be appreciated that if any one of the switches 64, 65 and 66 is closed and if any one of the switches 72, 73, 74, 75 is also closed, current will flow through the diode-and-resistor combination 80, 81 which extends between the rail associated with the selected closed switch 64, 65, or 66 (i.e. the rail 67, 68 or 69) and the rail associated with the closed switch 72, 73, 74 or 75 (i.e. the rail 76, 77, 78 or 79). Each diode and resistor combination 80, 81 is associated with a unique combination of one switch from the first group of switches 64, 65, 66, and one switch from the second group of switches 72, 73, 74 and 75.

Consequently, by closing a selected pair of switches, it is possible to cause current to flow through a selected resistor. Since the resistor forms the squib for a pyrotechnic device, which actuates a safety device in the vehicle, when the current flows the appropriate safety device is deployed.

It will be appreciated, therefore, that in the embodiment described, by using seven switches it is possible to provide individual control for twelve different safety devices.

Figure 5:
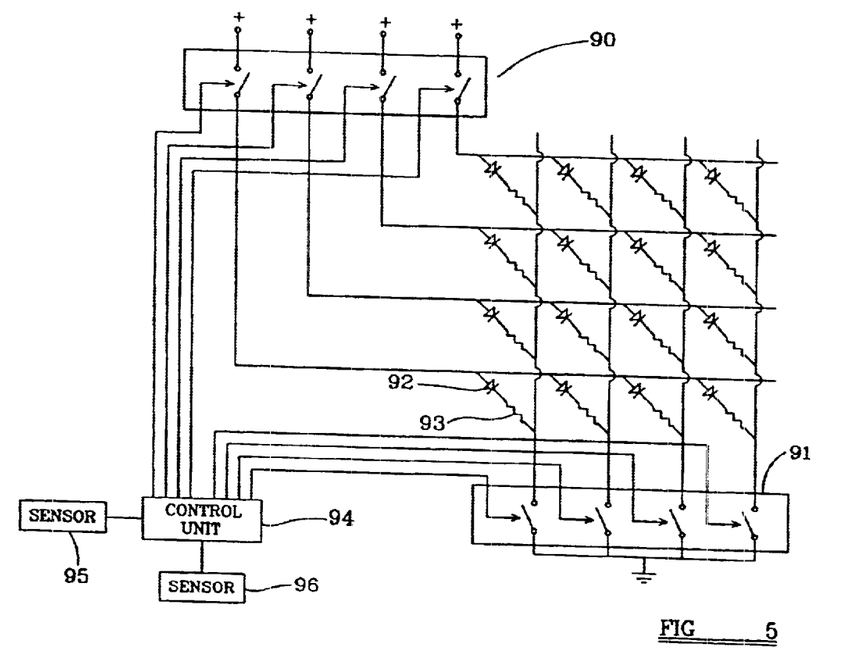
FIG. 5 is a circuit diagram of a further alternative triggering circuit.

FIG. 5 illustrates a modified embodiment of the arrangement as shown in FIG. 4 in which a first group of switches 90 is provided, comprising four switches connected between first conductors, each having a first source of potential and a plurality of rails, and a second group of switches 91 is provided, again comprising four switches connected between a second source of potential in the form of a second conductor connected to earth, and a plurality of rails. Each of the rails associated with the first group of switches is connected to each of the rails associated with the second group of switches by a series combination of a diode 92 and a resistor 93. Each resistor 93 may be the squib resistor of a safety device.

The number of switches in each group is the same, and in the embodiment illustrated there are four switches in each group. The switches of the groups 90 and 91 are controlled by a control unit 94. The control unit 94 receives signals from one or more sensors 95 adapted to sense when an accident is occurring or when an accident is about to occur. Such sensors 95, 96 may comprise acceleration sensors or impact sensors. In response to signals from the sensors 95, 96 the control unit will cause selected pairs of switches to be closed to deploy selected safety devices.

Figure 6:
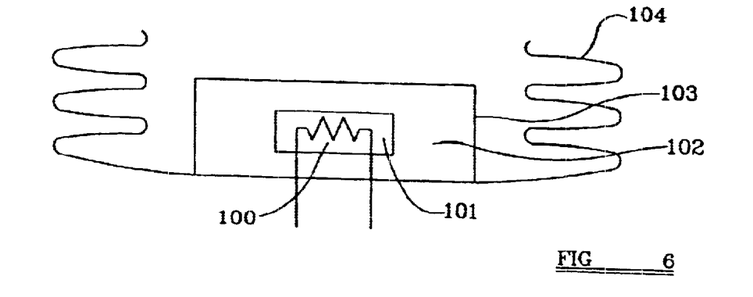
FIG. 6 is a block diagram illustrating a safety device.

FIG. 6 illustrates schematically part of a safety device incorporating a squib as described above in the form of an air-bag. A squib in the form of a resistor 100 is located within a pyrotechnic triggering charge 101, such that when an electric current runs through the resistor 100 and elevates the temperature of the resistor 100, the pyrotechnic charge 101 is activated. The pyrotechnic triggering charge 101 is surrounded by a further gas generating pyrotechnic charge 102 contained within a housing 103. The housing 103 is provided with a plurality of apertures therein (not shown) which direct gas generated by the actuation of the gas generating pyrotechnic triggering charge 102 to the interior of an air-bag 104. Thus, when a current flows through the resistor 100, the air-bag 104 is inflated and deployed.

Whilst reference has been made to squib resistors being provided in respective safety devices, it is to be understood that where a safety device with a controlled characteristic is used, there may be more than one squib associated with a single safety device. For example, an air-bag may be provided with two pyrotechnic gas generating charges, each with a separate respective squib.

Depending upon the weight of a person to be protected by the air-bag, and their position in the seat, either one of the gas generating charges, or the other of the gas generating charges, or both of the gas generating charges will be activated. Thus, two squib resistors may be associated with a single safety device.

Groups of switches may be closed to activate predetermined groups of safety devices. The diodes will prevent undesired reverse current flows through resistors when such groups of switches are closed at the same time.

The sources of potential described above may comprise a single capacitor or may comprise a plurality of individual capacitors. For example, in the embodiment of FIG. 3, a single capacitor may be provided connected across the rails 41 and 46.

However, in the embodiment of, for example, FIG. 4, a plurality of capacitors may be utilised. For example, three capacitors may be utilised, each having their negative plate connected to the rail 71, and each having their positive plate connected to a respective one of the switches 64,65,66. The potential applied to the three capacitors may vary in that the capacitors may be charged to different voltages. Thus, the sources of positive potential in the embodiment of FIG. 4 may be sources having the same potential or may, alternatively, comprise sources having different potentials.

Whilst, in the foregoing description, reference has been made to the use of activators in the form of squibs adapted to ignite a pyrotechnic charge, the invention may be equally applicable for use where activators of a different type are utilised. For example, in an embodiment of the invention there may be at least one activator which comprises a solenoid. It is to be understood that a solenoid may be utilised to release a spring biased belt pre-tensioner, or a solenoid may be utilised to release the closure of a compressed gas bottle to activate a safety device in the form of an air-bag.

Figure 7:
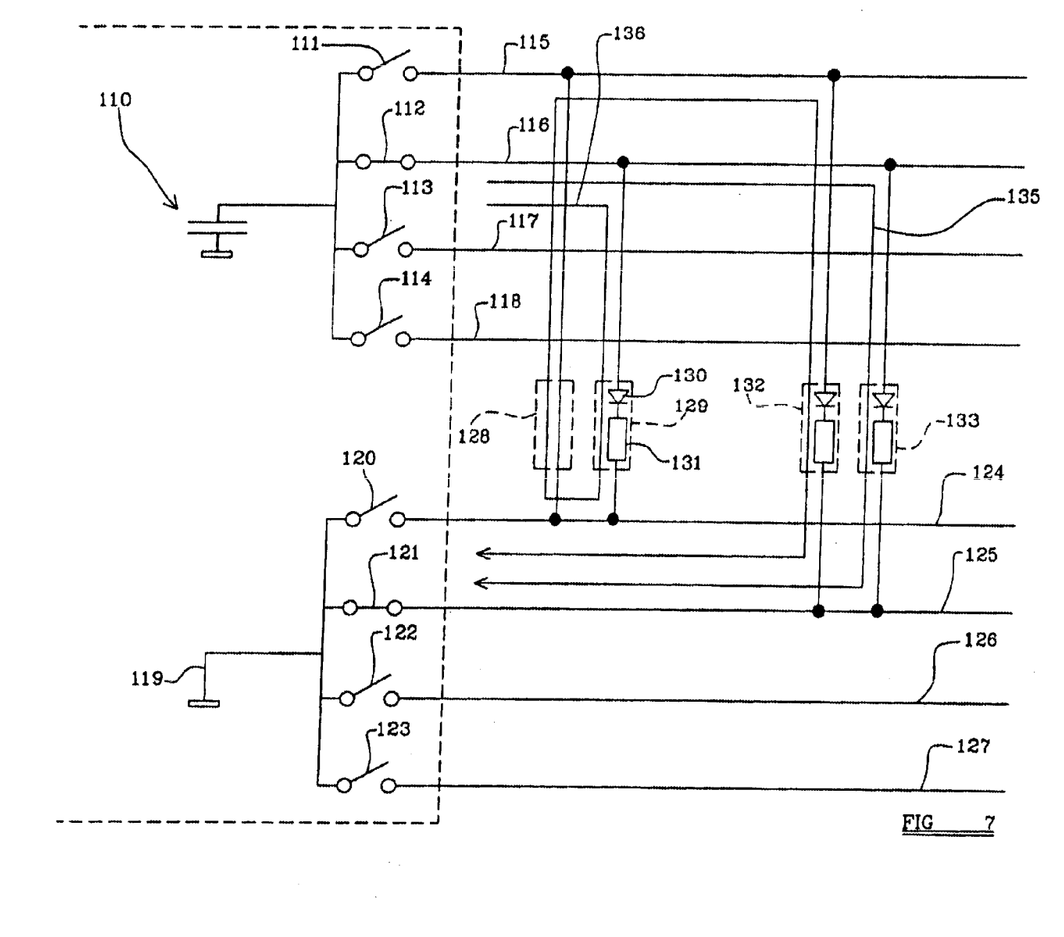
FIG. 7 is a circuit diagram provided for purposes of explanation.

FIG. 7 is a diagrammatic representation of part of a system of the general type shown in FIG. 4, and as described above.

In the arrangement illustrated, an energy reserve 110, illustrated in the form of a capacitor, is connected, by means of a first conductor which is connected to a first group of switches 111, 112, 113 and 114 to a plurality of rails 115, 116, 117, 118. A source of earth potential 119 is present on a second conductor connected by means of a second group of switches 120, 121, 122, 123 to a second set of rails 124, 125, 126, 127. A first squib unit 128 is shown connected between the rail 115 and the rail 124. In this particular example it is considered that this particular squib unit is suffering from a fault and has gone "short circuit". A second squib unit 129 is shown connected between the rail 116 and 124. The squib units 128, 129 are of a conventional form, as generally described above, comprising a diode 130 and a squib resistor 131.

A similar squib unit 132 is shown connected between the rail 115 and the rail 125, and a further squib unit of the same design 133, is shown connected between the rail 116 and the rail 125.

The switches 112 and 121 are shown to be closed in FIG. 7, and ordinarily one would therefore expect a current to flow along the rail 116 through the squib unit 133 and along the rail 125. This current flow is indicated diagrammatically by the line 135. However, this is not the only consequence of closing the switches 112 and 121 since the "short" constituted by the squib unit 128 is effectively a direct connection between the rail 115 and the rail 124. As a consequence of this connection, closing the switches 112 and 121 causes current to flow along the current flow path indicated by the line 136, with that current flow path extending from the rail 116 through the squib unit 129 to the rail 124, through the short circuit constituted by squib unit 128 to the rail 115, and finally through the squib unit 132 to the rail 125. Thus, current flows through each of the squib units 133, 132 and 129. The current flow may cause all or none of the squib units to be actuated, depending upon the level of current flow which depends, in turn, upon the energy present in the energy reserve or capacitor 110.

Figure 8:
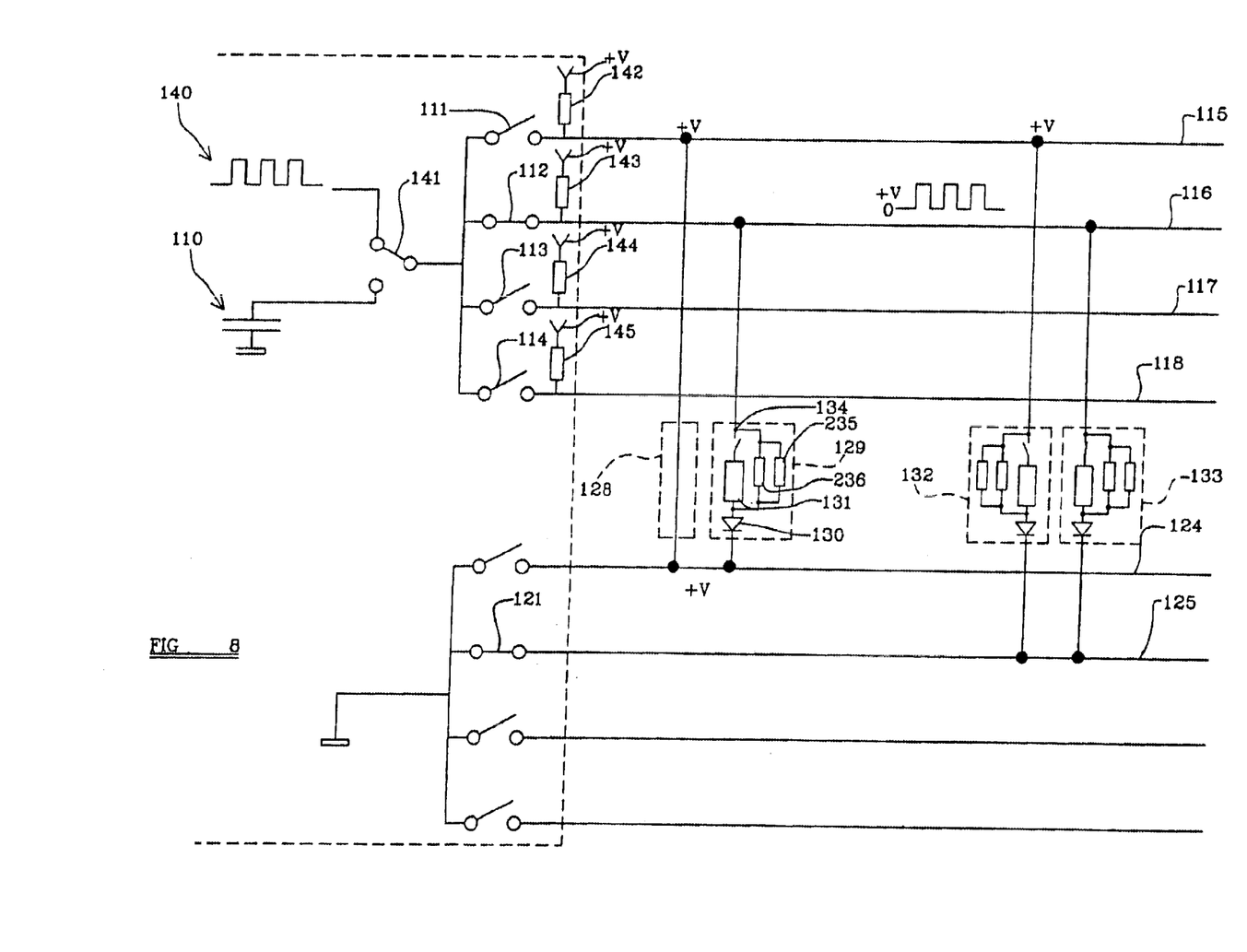
FIG. 8 is a circuit diagram showing part of a modified embodiment of the invention.

FIG. 8 is a view corresponding to FIG. 7 illustrating a modified embodiment in which each squib unit is provided with a command controlled switch.

For the sake of ease of understanding, the same reference numerals are used in FIG. 8 as have been used in FIG. 7, and the illustrated features will not be re-described. However, each of the squib units 129, 132 and 133 contain not only a diode 130 and a squib resistor 131, but also a command controlled switch 134. A command controlled switch is a switch which ordinarily remains in the open state, but which moves to the closed state on receipt of an appropriate coded command signal. The combination of a decoder 235 and a resistor 236 connected in parallel with the decoder is connected across the series connection of the switch 134 and the squib 131. The resistor 236 and the diode 130 thus form a connection between the rail 116 and the rail 124. If the potential on the rail 116 is greater than that on the rail 124 a potential difference will exist across the resistor 236 and this may be detected by the decoder. If the potential on the rail 124 is greater than that on the rail 116, there is no potential across the resistor 236 due to the effect of the diode 130. Of course, if the potential on the rails 116 and 124 is the same, there will be no potential difference across the resistor 236. The resistor 236 has a resistive value much greater than that of the squib 131 so that, when the switch 134 is closed a much greater current will flow through the squib 131 than through the resistor 236.

Each command controlled switch may be such that it will close only in response to a command signal that is unique and specific for that switch. However, it is possible that each switch may respond to the same command signal.

With continuing reference to FIG. 8, it is to be observed that a command signal generator 140 is provided which can be connected, by means of a switch 141, to terminals of the switches 111 to 114 inclusive. Each of the lines 115 to 118 which are associated, respectively, with the switches 111 to 114 is connected to a source of positive potential by a respective resistor 142 to 145. Thus each line is maintained at a positive potential.

In FIG. 8, switches 112 and 121 are again in the closed condition, but initially a command signal from the command signal generator 140 is supplied to the input terminals of the switches 111 to 114. The command signal is a series of pulses which serve to pull the potential of line 116 down from the positive voltage supplied by the resistor 143, to earth. The potential across the resistor 236 within the unit 133 thus changes from a detectable potential difference when the command signal voltage is positive, to no potential difference when the command signal voltage is at earth potential, and these differences in potential are sensed by the decoder 235, which then closes the switch 134 if the appropriate coded signal is detected.

Thus, as an initial step in operating the described system, a command signal is generated which closes the switch within the squib unit 133. Even if a squib, such as the squib 128 is 'short circuit' the command signal will not be sensed by any other decoder. Due to the 'short circuit' of squib 128 the rail 124 will become 'positive' because the rail 115 is 'positive'. When the command signal applied to the rail 116 is positive there will be no potential across the resistor 236 in unit 129, as the potentials on the rails 116 and 124, across which the unit 129 is connected, will be equal. When the command signal applied to the rail 116 is at earth there will be no potential across the resistor 236 in the unit 129 due the effect of the diode 130, as the potential on rail 116 will be lower than the potential on rail 124. Consequently the decoder 235 in the unit 129 will not sense any change in potential difference across the resistor 236, and will not detect a command signal to cause the decoder to close the switch 134 of the unit 129. Thus, a single command signal may be used, to which each decoder in the described arrangement may respond, but for added security it may be preferred to utilise command controlled switches which each respond to a unique command signal.

When the command controlled switch within the unit 133 has been closed, in the manner described above, the switch 141 is actuated so that energy from the energy reserve 110 is passed to the input terminals to the switches 111 to 114. Because the squib unit 133 is the only squib unit within the complete array which has a closed command controlled switch, it is only the squib unit 133 that is actuated, even though the squib unit 128 is shown, in this embodiment, as being in a 'short circuit' condition.

Figure 9:
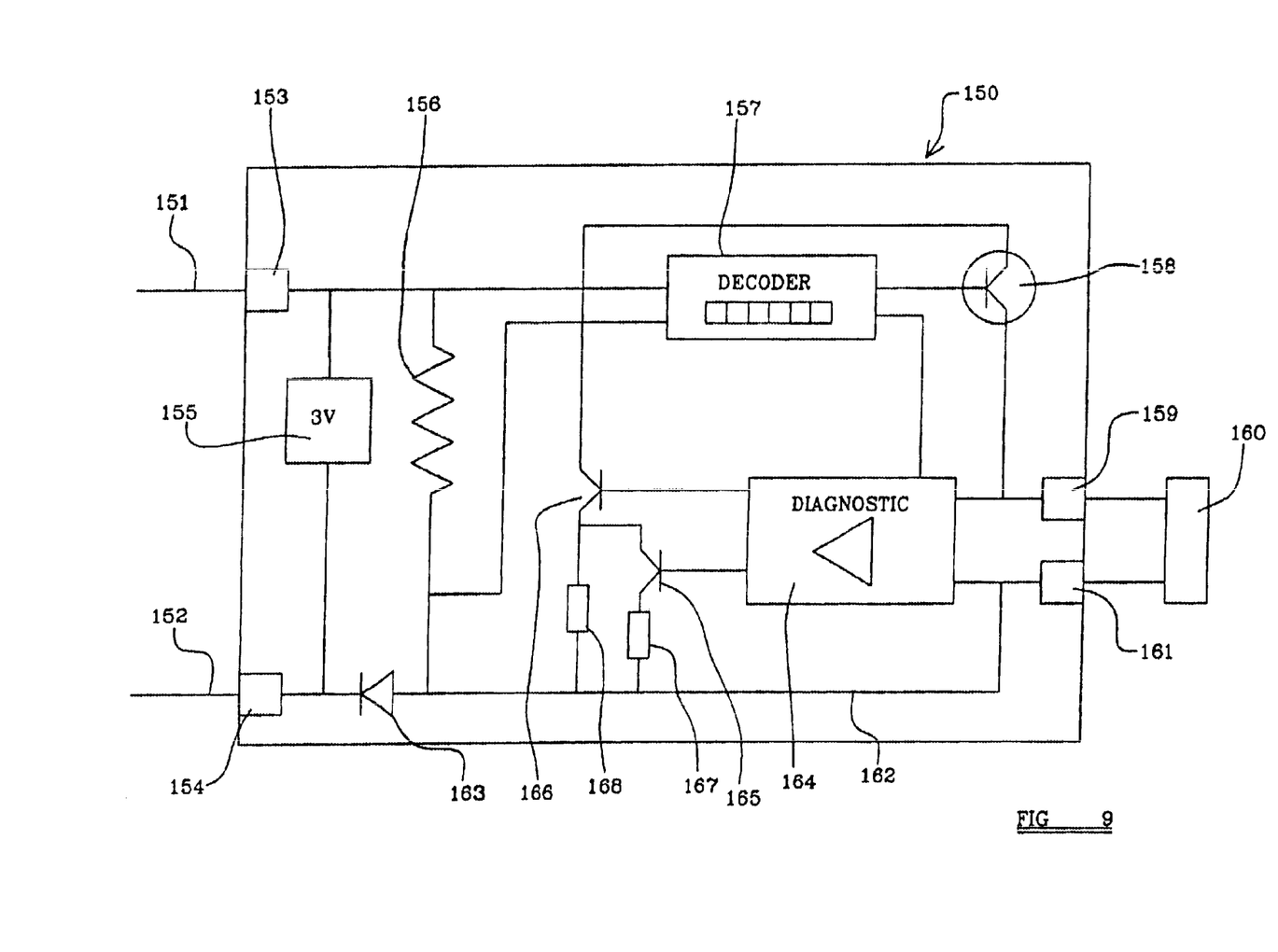
FIG. 9 is a block diagram showing a component of the circuit of FIG. 8.

Turning now to FIG. 9, the squib unit 150, which incorporates a command controlled switch, represents a more detailed example of one of the squib units 129, 132, 133 of FIG. 8. The squib unit 150 includes a first lead 151 adapted to be connected to one rail of a system of the type shown in FIG. 8, and a second lead 152 adapted to be connected to another rail. The leads extend to input terminals 153, 154. The terminals 153, 154 are connected to a rechargeable power source 155, such as a capacitor, which may be utilised to provide power to the remaining components which are to be described. The power source 155 does not form a conductive path between the leads 151 and 152. The power source is connected to provide power to components within the unit 150 which require power to operate by leads which are not shown in the drawing for the sake of simplification.

The terminal 153 is connected to a resistor 156 (which corresponds to resistor 236 in FIG. 8) which is connected in parallel with a decoder 157 (which corresponds to decoder 235 in FIG. 8). The decoder is adapted to decode signals transmitted over the rails connected to the leads 151 and 152. The decoder is adapted to close a transistor switch 158 (which corresponds to switch 134 in FIG. 8) when an appropriate code signal is received. The switch 158 is a transistor, the controlled current path of which is connected between the input terminal 153 and a connector terminal 159 which is connected to a squib resistor 160 (which corresponds to 131). The squib resistor 160 has a much lower resistance than that of the resistor 156. The squib resistor is connected to a second connector terminal 161. The connector terminal 161 is connected, by means of a lead 162 and a diode 163 to the terminal 154 connected to the second lead 152.

The two connector terminals 159 and 161 are connected as inputs to a diagnostic circuit 164 which is adapted to diagnose, for example, the resistance of the squib resistor 160 and other parameters as may be appropriate. The diagnostic circuit has two outputs connected to transistor switches 165, 166, the outputs of the switches being connected to code generator units 167, 168 which are connected to the conductor 162, the transistor switches 165, 166 also being connected to receive power from the lead 151 or the power source 155. The diagnostic circuit 164, by controlling the switches 165 and 166, can cause appropriate coded signals to be generated and transmitted. The diagnostic circuit 164 is shown as being connected to the decoder 157 so that the diagnostic circuit may be activated upon receipt of an appropriate control signal by the decoder. The parallel connection of the resistor 156 and the decoder 157 is connected to the lead 162 at a point separated from the terminal 154 by the diode 163. It will be seen that if the potential applied to the lead 151 is higher than that applied to the lead 152 a potential difference will exist across the resistor 156, but otherwise there will not be a potential difference across the resistor 156. It is this potential difference that is sensed by the decoder 157.

It is to be appreciated, therefore, that if the decoder 157 senses and decodes an appropriate control signal, the decoder will close the transistor switch 158 and then a current flow path is completed from the first lead 151 through the closed switch 158 and the associated terminal 159, through the squib resistor 160, through the terminal 161, the lead 162 and the diode 163 to the lead 152.

It is to be appreciated that in a modified embodiment of the invention, the switches and rails as described above, may be associated not only with actuating elements, such as squibs, connected between the rails, but also sensor elements, such as sensor switches.

Figure 10:
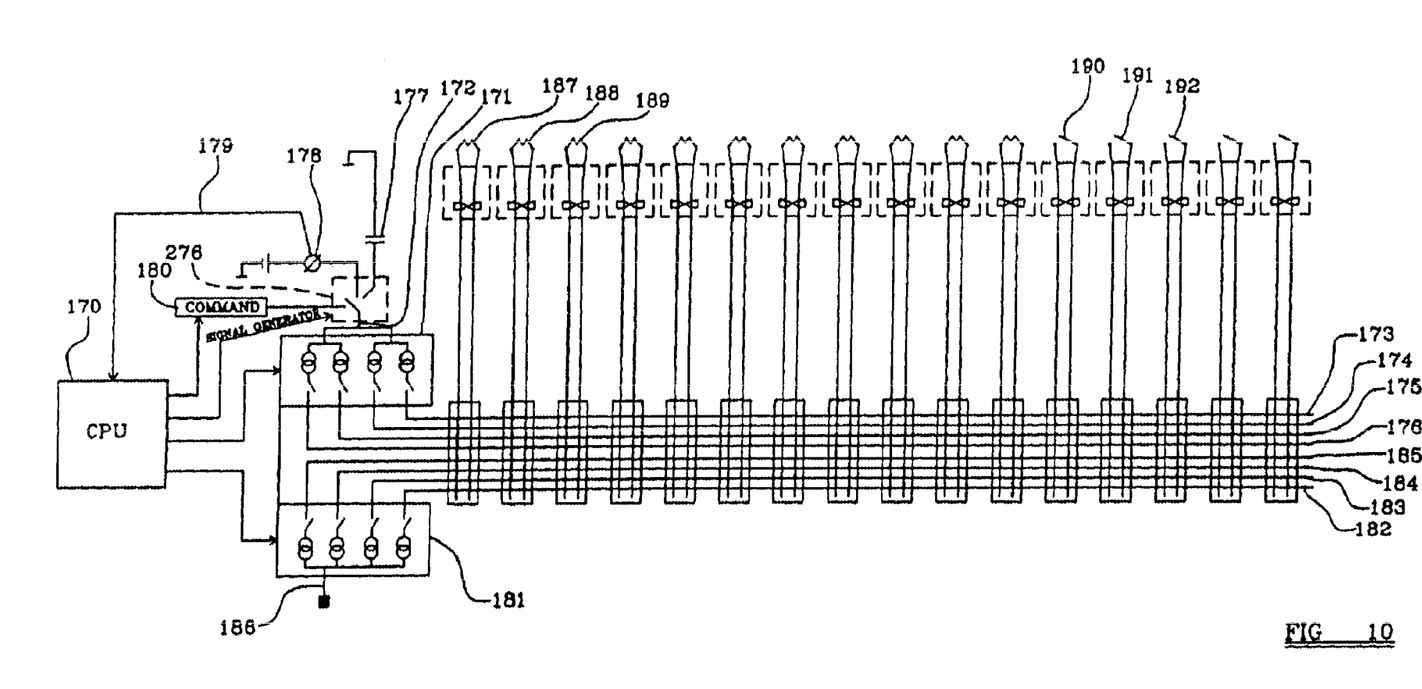
FIG. 10 is a further circuit diagram provided for purposes of explanation.

FIG. 10 illustrates an arrangement in which such sensor switches are incorporated in the system.

Referring now to FIG. 10, a central processor unit 170 is provided which effects a control function. The central processor unit 170 is adapted to control switches within a first switching block 171, the switches being adapted to connect a first conductor 172 to a selected one or more of plurality of rails 173, 174, 175, 176. The first conductor 172 is connectable, by means of a switch 276 to either a source of energy 177, or a parameter sensor 178 or, to a command signal generator 180 which is controlled by the central processor unit. The parameter sensor 178 may be an ohmmeter, the output of which is connected by lead 179 to the central processing unit 170. Thus the combination of the switch block 171 which incorporates four switches, and the switch 276 may be utilised to supply to one or more selected rails 173 to 176, either a source of potential from the energy source 177, or a command signal from the command signal generator 180, or may connect the rail or rails to the parameter sensor 178.

The central processor unit controls a second switch block 181 which incorporates switches connected to rails 182, 183, 184 and 185, and being closeable to connect a selected one or more of the rails individually or simultaneously to a second conductor 186 which is connected to earth.

It can be seen that a plurality of squib units, only some of which are referenced, are provided. The squib unit 187 is connected, for example, to the rail 173 and to the rail 185. The squib unit 188 is connected to the rail 173 and to rail 184. The squib unit 189 is connected to the rail 173 and to the rail 183. Each squib unit may, for example, be of the type described above with reference to FIG. 9.

However, it is to be observed that the described system incorporates a plurality of sensor switches, such as the sensor switches 190, 191 and 192. Again only some of the sensor switches have been referenced. The sensor switch 190 is connected between the rail 175 and the rail 182. The sensor switch 191 is connected between the rail 176 and the rail 185. The sensor switch 192 is connected between the rail 176 and the rail 184.

It is to be appreciated, therefore, that by closing appropriate switches within the switch blocks 171 and 181, it is possible to access one or more squib units, such as the squib units 187, 188 and 189, and by providing firstly an appropriate command signal, and secondly an appropriate pulse of energy, these squib units may be activated so that the respective safety device or devices become deployed. Also it is to be understood that by closing appropriate switches within the switch blocks 171 and 181 sensor switches, such as the sensor switches 190, 191 and 192 as mentioned above may be accessed, and those sensor switches may be connected, by an appropriate actuation of the switch 276, to the parameter sensor constituted by the ohm-meter 178, thus enabling the condition of the sensor switches 190, 191 and 192 to be determined. The sensor switches 190, 191 and 192 may be connected to appropriate items forming part of a safety system in a motor vehicle, such as seat-belt buckles.

Consequently the central processor unit may, from time to time, interrogate the condition of the sensor switches, so as to determine which items of safety equipment within the vehicle are in use. Thus the central processor unit may determine if a particular safety-belt is in use or not. The central processor unit may additionally determine if the seat associated with that particular safety-belt is occupied or not, by interrogating a sensor switch associated with a load sensor which is responsive to the load applied to the seat by the mass of the occupant resting on the seat. The central processor unit may, as a consequence of these determinations, modify or control the mode of deployment of a particular safety device. If a particular safety-belt is not in use, there is no point in activating a pre-tensioner associated with that safety-belt. However, if a safety-belt is not in use, although the seat associated with that safety device is occupied, then an air-bag located in front of that seat may need to be deployed in the specific manner in order to provide a desired degree of protection for the occupant of the seat. The air-bag may be deployed in a different manner, however, if the seat-belt associated with that seat is actually being worn.

Whilst, in FIG. 10, simple sensor switches 190 to 192 have been illustrated, it is to be understood that different types of sensor switches may be utilised.

Figure 11:
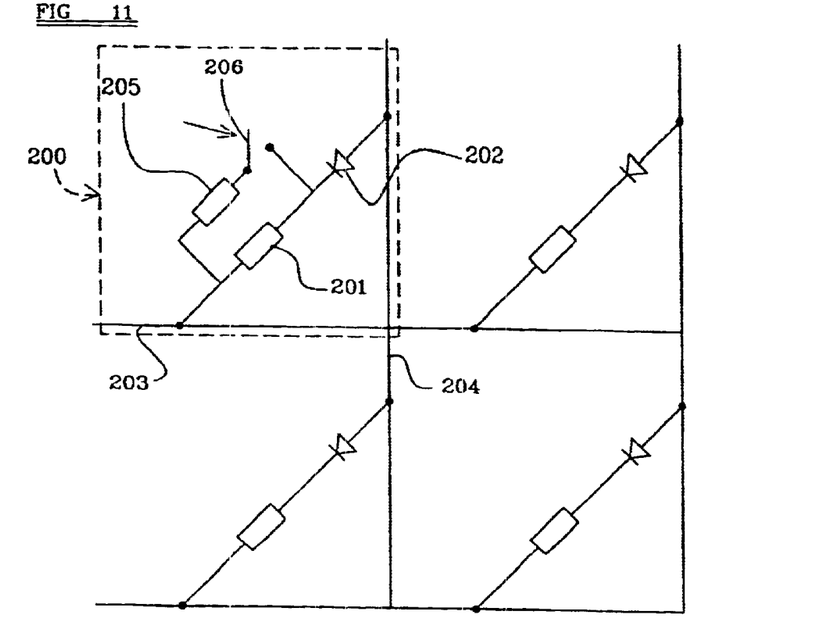
FIG. 11 is part of a circuit diagram illustrating one embodiment of the invention.

FIG. 11 is part of a circuit diagram of an arrangement in accordance with the invention in which a sensor unit 200 is provided, that sensor unit comprising a resistor 201 and a diode 202 connected in series between a rail 203 of a first set of rails and a rail 204 of a second set of rails, of the type generally described above. A second resistor 205 is provided which is connected in series with a switch 206, the arrangement being such that if the switch 206 is closed, the resistor 205 is connected in parallel with the resistor 201.

It is to be appreciated, therefore, that if the switch 206 is closed, an ohm-meter, such as the ohm-meter 178 as described with reference to FIG. 10, would detect a different resistance to that detected if the switch is open.

Figure 12:
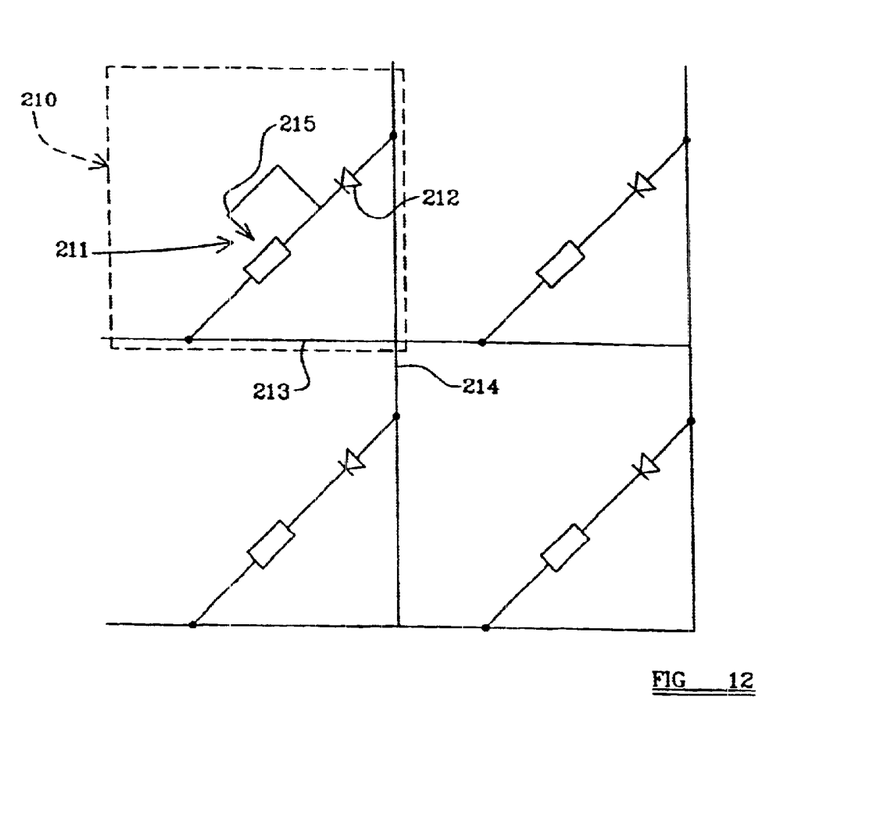
FIG. 12 is part of a circuit diagram corresponding to FIG. 11 illustrating an alternative embodiment of the invention.

FIG. 12 illustrates a further modified embodiment of the invention in which a sensor 210 is provided, the sensor 210 comprising a potentiometer 211, connected in series with a diode 212, between a first rail 213 of a first set of rails and a second rail 214 of a second set of rails, the rails again being of the general type described above. The potentiometer 211 has a slider 215, the slider being connected to the node between the resistor 211 of the potentiometer and the diode 212. The slider may be caused to slide along the potentiometer in response to an applied force. Thus, for example, the slider may slide along the potentiometer in response to a person sitting in a particular vehicle seat, the degree of movement of the slider being related to the mass of the seat occupant. It is to be appreciated, again, that the effective position of the slider 215 may be determined by an ohm-meter 178 of the type referred to with reference to FIG. 10.

What is claimed is:

1. A safety system for a motor vehicle, comprising:
   at least one safety device, each safety device adapted to be activated in the event that an accident should occur, each safety device including at least one element selected from a group comprising an electric activator for activating the safety device and a sensor to sense a parameter related to the safety device, the safety system including a plurality of the elements;
   a first conductive arrangement comprising at least one first conductor and a first group of a plurality of switches, each switch of the first group being connected to a said first conductor; and
   a second conductive arrangement comprising at least one second conductor and a second group of a plurality of switches, each switch of the second group being connected to a said second conductor;
   wherein the elements are connected in a circuit, with each element being connected between one switch of the first group of switches and one switch of the second group of switches, and wherein at least one switch in each group is connected to at least two elements, with each of said two elements being connected to different switches of the other group of switches.

2. The safety system according to claim 1, wherein each said element is connected to a unique combination of one switch from the first group of switches and one switch from the second group of switches.

3. The system according to claim 1, wherein at least some of said elements comprise electric activators including squibs each comprising a resistor associated with a respective pyrotechnic charge.

4. The system according to claim 1, wherein at least one element comprises an electric activator including a solenoid.

5. The system according to claim 1, wherein the first conductive arrangement is adapted to be connected to at least one source of the first potential and the second conductive arrangement is adapted to be connected to at least one source of a potential which is different from said first potential.

6. The system according to claim 1, wherein at least some of the elements comprise sensors.

7. The system according to claim 6, wherein each sensor comprises an element selected from the group including a switch and a resistor.

8. The system according to claim 6, wherein each switching arrangement connects each sensor in circuit with a parameter sensor.

9. The system according to claim 8, wherein the parameter sensor comprises an ohm-meter.

10. The system according to claim 3, further including a plurality of command controlled switches and a command signal generator adapted to generate at least one command signal to close each command controlled switch, wherein at least some of said electrical activators are connected in series with a respective one of the command controlled switches.

11. A safety system for a motor vehicle, comprising:
   at least one safety device, each safety device adapted to be activated in the event that an accident should occur, each safety device including at least one electrical activator for activating the safety device, each activator including a respective command signal controlled switch, wherein the safety system includes a plurality of activators;
   a first conductive arrangement comprising at least one first conductor and a first group of a plurality of switches, each switch of the first group being connected to a said first conductor;
   a second conductive arrangement comprising at least one second conductor, and a second group of a plurality of switches, each switch of the second group of switches being connected to a said second conductor;
   wherein the activators are connected in a circuit, with each activator being connected between one switch of the first group of switches and one switch of the second group of switches, and wherein at least one switch in each group is connected to at least two activators, with each of said two activators being connected to different switches of the other group of switches, and
   the system further including a command signal generator adapted to generate at least one command signal to close said command signal controlled switches.

12. The safety system according to claim 11, wherein at least one safety device includes a plurality of activators, the identity of the activator or activators utilised to activate the safety device determining the mode of operation of the safety device.

13. The safety system according to claim 11, wherein each switch in each group of switches is connected to the same number of activators as there are switches in the other group of switches.

14. The safety system according to claim 13, further including a first group of rails and a second group of rails, wherein each switch of the first group is connected to a respective rail in the first group of rails and each switch of the second group is connected to a respective rail in the second group of rails, individual rails in the first group of rails being connected to individual rails in the second group of rails by means of respective activators.

15. The safety system according to claim 11, further including a control unit, wherein the switches of the two groups of switches are individually controlled by the control unit, the control unit being responsive to sensors adapted to provide signals in the event that an accident is about to occur or is occurring.

16. The safety system according to claim 15, wherein the control unit is responsive to signals from a sensor indicating the presence of or position of an occupant of the vehicle.

17. The safety system according to claim 11, wherein each command signal controlled switch responds to a unique command signal.

18. A safety system for a motor vehicle, comprising:

at least one safety device adapted to be activated in the event that an accident should occur;

at least one electric activator for activating the safety device, there being a plurality of said activators in the complete safety system;

at least one source of a first potential and a first group of a plurality of switches, each being connected to a said source of first potential, and at least one source of a different potential, and a second group of a plurality of switches, each being connected to a said source of different potential, the activators being connected in circuit, with each activator being connected between one switch of the first group of switches and one switch of the second group of switches, the arrangement being such that at least one switch in each group is connected to at least two activators, with each of said two activators being connected to different switches of the other group of switches.

19. The safety system according to claim 18, wherein at least one of said activators comprises a squib in the form of a resistor associated with a pyrotechnic charge.

20. The safety system according to claim 18, wherein at least one activator comprises a solenoid.

21. The safety system according to claim 20, wherein said solenoid is adapted to release a spring biased belt pretensioner.

22. The safety system according to claim 20, wherein said solenoid is adapted to release the closure of a compressed gas bottle to activate the safety device.

23. The safety system according to claim 18, wherein the said first potential is a negative potential and each source of different potential is a source of positive potential.

24. The safety system according to claim 18, wherein there are a plurality of sources of second potential, the sources of second potential having the same potential.

25. The safety system according to claim 18, wherein there are a plurality of sources of second potential, the sources of second potential having different potentials.

26. The safety system according to claim 18, wherein the sources of potential comprise at least one charged capacitor.

27. The safety system according to claim 26, wherein the sources of potential comprise a plurality of charged capacitors, the capacitors being charged to different voltages.

28. The safety system according to claim 18, wherein there is only one single source of the said different potential.

29. The safety system according to claim 18, wherein at least one safety device is provided with a plurality of activators, the identity of each activator of said plurality of activators being utilised to activate the safety device determining the mode of operation of the safety device.

30. The safety system according to claim 18, wherein each switch in each group of switches is connected to the same number of activators as there are switches in the other group of switches.

31. The safety system according to claim 30, wherein each switch of the first group is connected to a respective rail, forming a first group of rails, and each switch of the second group is connected to a rail, forming the second group of rails, each individual rail in the first group of rails being connected to each individual rail in the second group of rails by means of a respective activator.

32. The safety system according to claim 18, wherein each activator comprises a resistor which is in series with a diode.

33. The safety system according to claim 18, wherein the number of switches in the first group of switches is equal to the number of switches in the second group of switches.

34. The safety system according to claim 18, wherein the switches of the two groups of switches are individually controlled by means of a control unit, the control unit being responsive to sensors adapted to provide signals in the event of an accident about to occur or is occuring.

35. The safety system according to claim 34, wherein the control unit is further responsive to signals from sensor means indicating the presence of or position of an occupant of the vehicle.

* * * * *